United States Patent [19]

Bordere et al.

[11] Patent Number: 4,889,910

[45] Date of Patent: Dec. 26, 1989

[54] PURIFICATION OF CRUDE POLYORGANOPHOSPHAZENES

[75] Inventors: Serge Bordere, Billere; Guy Pagniez, Poey de Lescar; Philippe Potin, Billere, all of France

[73] Assignee: Atochem, Puteaux, France

[21] Appl. No.: 257,946

[22] Filed: Oct. 14, 1988

[30] Foreign Application Priority Data

Oct. 14, 1987 [FR] France ................... 87 14215

[51] Int. Cl.$^4$ ............................................ C08G 79/02
[52] U.S. Cl. ................................... 528/168; 528/480; 525/326.4; 525/538
[58] Field of Search ............................. 525/326.4, 538; 528/168, 480, 495

[56] References Cited

U.S. PATENT DOCUMENTS 4,720,533  1/1988  Pettigrew ........................... 528/28
4,734,471  3/1988  Chang ................................. 528/168

Primary Examiner—Harold D. Anderson
Assistant Examiner—T. Mosely
Attorney, Agent, or Firm—Burns, Doane, Swecker & Mathis

[57] ABSTRACT

Crude polyorganophosphazenes, produced by the nucleophilic cosubstitution of polydichlorophosphazenes and contained in a reaction medium which includes such polyorganophosphazenes, reaction solvent for the cosubstitution reaction, excess nucleophilic reagent and/or product of neutralization thereof, and, when present, any alkali metal salts of neutralization, are efficiently and facilely purified, in a single treatment zone, advantageously under agitation in a discontinuous malaxator, by both eliminating the reaction solvent and thereafter washing the resulting reaction medium with a liquid which is a nonsolvent for the polyorganophosphazenes, but miscible with the other products present in said reaction medium.

16 Claims, No Drawings

PURIFICATION OF CRUDE POLYORGANOPHOSPHAZENES

BACKGROUND OF THE INVENTION

1. Field of the Invention

The present invention relates to a process for the purification of crude polyorganophosphazenes produced by the cosubstitution of polydichlorophosphazenes.

The polyorganophosphazenes resulting from the cosubstitution reaction of polydichlorophosphazenes by nucleophilic reactants comprise a plurality of recurring units of the formula:

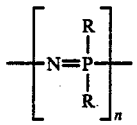

(I)

in which the symbols R, which have at least two different definitions within a single recurring unit and/or from one unit to another, are particularly alkoxy, fluoroalkoxy, phenoxy, alkylamino or arylamino groups. Examples of such polyorganophosphazenes are given, e.g., in *Polymer News*, volume 5, No. 1, pages 9–17 (1978).

Among such polyorganophosphazenes, this invention more especially relates to the amorphous polymers, which occur generally in the form of a rubbery mass having more or less elastomeric properties.

2. Description of the Prior Art

It is known to this art that the isolation of the subject polyorganophosphazenes from the medium in which they were synthesized presents certain difficulties. Indeed, the last stage in their preparation entails reacting nucleophilic compounds such as sodium alcoholates or sodium phenates with polydichlorohosphazene, usually in a hydrocarbon or an ether, or a mixture of the two (see, for example, U.S. Pat. Nos. 4,514,550, 3,970,533, 4,576,806 or the article in *Polymer News*, loc. cit.).

Upon completion of the reaction, the excess of nucleophile is generally neutralized by means of an acid, such as hydrochloric acid or sulfuric acid.

The polyorganophosphazene is thus present in a concentration generally ranging from 5 to 35% in a medium containing a hydrocarbon and/or an ether, an excess of phenol or alcohol, possibly other substitution reactants, and a salt, generally of sodium.

It has already been proposed to the art (U.S. Pat. No. 4,116,785) to precipitate the polymer by contacting the solution described above with a nonsolvent such as methanol. Such a process requires the use of a quantity of solvent which may constitute 20 to 40 times the quantity of polymer to be separated. Hence, to obtain the polymer requires the use of a reactor of large capacity in relation to the quantity of polymer recovered. Moreover, when the polymer occurs in the form of a rubbery mass, which is more or less tacky, such as is produced when the polymer bears at least two different substituents, the extraction of the polymer from the reactor in which it was produced must typically be done manually.

SUMMARY OF THE INVENTION

Accordingly, a major object of the present invention is the provision of an improved process for isolating and purifying the polyorganophosphazenes which avoids those disadvantages and drawbacks to date characterizing the state of this art, and which improved process features elimination of the solvents used in the synthesis and ensuring the washing of the polymer within the same apparatus.

Briefly, the present invention features a process for the purification of crude polyorganophosphazene elastomers produced by nucleophilic cosubstitution of polydichlorophosphazenes, such crude polyorganophosphazenes being present in a reaction medium comprising the polyorganophosphazenes, the solvent(s) used for the cosubstitution reaction, the excess of nucleophilic agents and/or their neutralization products and, if appropriate, the alkali metal salts resulting from said neutralization, and which comprises, within the same apparatus, on the one hand eliminating the solvent(s) present in the polyorganophosphazene synthesis medium and, on the other, washing the medium obtained after said elimination by treatment with a product which is a nonsolvent for the polyorganophosphazene, but miscible with the other products present in such medium.

DETAILED DESCRIPTION OF THE PREFERRED EMBODIMENTS OF THE INVENTION

More particularly according to the present invention, the elimination of the solvent(s) is preferably carried out by distillation under reduced pressure. The washing is advantageously carried out at a temperature which can range from ambient temperature, for example 20° C., to 200° C.

The selection of the temperature for washing may be dictated in particular by the nature of the solvent and the pressure at which it is possible or desirable to work. Provided that the characteristics of insolubility of the polymer and miscibility of the other products are respected, it is advantageous to conduct the operation at the highest temperature possible. Usually this selection favors the solubility and the speed of diffusion of the products to be extracted from the polymer mass.

Illustrative of the apparatus for carrying out the process according to the invention, discontinuous malaxators in which the chamber can be heated and, if appropriate, placed under reduced pressure, are particularly representative.

Such apparatuses are widely described in the literature, and their geometry or dimensions do not in and of themselves constitute an object of this invention. It is possible, for application of the process according to the invention, to use different types of malaxators, differing for example in the number and/or the geometry of the malaxating arms, the horizontal or vertical disposition of said arms, the greater or lesser complexity of their movements, whether they consist for example of systems combining an axial displacement with a rotatory movement or systems in which the axis of rotation of the arms is itself fixed on a rotating platform, thus imparting a planetary movement to the rotating arms. Such malaxators can include accessory systems such as scrapers, deflectors or extrusion dies permitting extraction of the polymer upon completion of the operation.

Whatever the type of malaxator used, it will be expedient, if necessary, to connect to said malaxator means permitting the distillation of the solvents, the condensation of the vapors and the collection of the condensates.

The distillation being accompanied by a more or less copious production of foam, it is advantageous to provide an expansion chamber to increase the useful volume of the chamber of the malaxator, or to have available between the chamber and the vapor condenser a capacity allowing the elimination of the foam by expansion. In a preferred alternative embodiment, a grill will be provided at the outlet for the vapors from the chamber with the purpose of retaining the particles of polymer which might be carried off.

In the same fashion, it will be expedient, if necessary, to connect a washing medium feed system to the malaxator.

The process according to the invention can be used for the purification of the various polyorganophosphazenes comprising a plurality of recurring units of the formula (I) given above.

This invention is especially applicable for the purification of polyorganophosphazenes in which at least some of the symbols R represent monovalent radicals of the formulae:

$$R_1-O- \quad (II)$$

or $$R_2R_3-N- \quad (III)$$

in which the symbol $R_1$ is an alkyl radical containing 1 to 12 carbon atoms, whether unsubstituted or partially substituted by fluorine atoms; a cycloalkyl radical containing 5 or 6 carbon atoms; a monocyclic or polycyclic aryl radical, optionally mono- or polysubstituted by a chlorine atom, by an alkoxy radical containing 1 to 3 carbon atoms, by an alkyl radical, linear or branched, which can contain up to 10 carbon atoms or by an allyl radical; the symbol $R_2$ is an alkyl or alkenyl radical containing up to 6 carbon atoms; a monocyclic or polycyclic aryl radical; an alkylaryl radical containing up to 12 carbon atoms; the symbol $R_3$ can have one of the definitions of the symbol $R_2$ or is a hydrogen atom; with the proviso that two of such R symbols in the same recurring unit can together form a radical of the formulae:

$$-O-R_4-O- \quad (IV)$$

$$-NR_3-R_5-NR_3- \quad (V)$$

in which the symbols $R_4$ or $R_5$ are one of the divalent radicals corresponding to the monovalent radicals represented by $R_1$ and $R_2$, and the symbol $R_3$ is as defined above.

When a symbol R does not represent a radical having one of the formulae II, III, IV or V, it can be a monovalent radical selected from among alkyl, cycloalkyl, aryl, alkylaryl, alkoxyaryl or aralkyl radicals, with the proviso that the alkyl radicals or the alkyl moiety of the radicals given above may be substituted by one or more fluorine atoms, and said radicals represented by a symbol R containing up to carbon atoms. Exemplary of the radicals $R_1$, particularly representative are those of the formulae:

$CH_3-$; $CH_3CH_2-$; $CF_3CH_2-$; $p.C_9H_{17}-C_6H_4-$;

$C_3F_7CH_2-$; $HC_4F_8CH_2-$; $C_6H_5-$;
$CH_2=CH-CH_2-$;

$m.Cl-C_6H_4-$; $p.Cl-C_6H_4-$; $p.C_2H_5-C_6H_4-$;

$p.CH_3O-C_6H_4-$; $p.(sec\ C_4H_9)C_6H_4-$;

$o.(CH_2=CH-CH_2)-C_6H_4$;
$p.(CH_2=CH-CH_2)o.(CH_3O)C_6H_3-$

Exemplary of the radicals $R_2$ and, if appropriate, $R_3$, particularly representative are those of the formulae:

$CH_3-$; $C_6H_5-$; $p.CH_3O-C_6H_4-$;
$CH_2=CH-CH_2-$

Exemplary of the radicals R, when such radicals do not correspond to any of the formulae II, III, IV or V, representative are those of the formulae:

$C_6H_5-$; $C_3F_7CH_2-$;

$HCF_2C_3F_6CH_2$

In the polymers noted above, a certain percentage, for example less than 30%, of the recurring units of formula (I) can contain a radical R having one or more sites of ethylenic unsaturation. Exemplary such radicals are:

$CH_2=CH-CH_2-C_6H_4-O-$, the allyl substituent being particularly adopted to occupy the ortho position on the phenoxy grouping, or a radical:

$(CH_2=CH-CH_2)_2N-$.

The process according to the invention is applicable quite specifically to polyorganophosphazenes, the radicals of which being as above-defined, and having a value of D such that the intrinsic viscosity of said polymers (measured in THF at 30° C.) is within the range of from 10 to 250 ml/g.

As mentioned above, the subject polyorganophosphazenes can be prepared by reaction of nucleophilic reagents with polydichlorophosphazenes. Taking account of the various definitions which are possible for R and in particular those enumerated previously, the nucleophilic reagents are advantageously selected from among the alcoholates and phenates of the formulae:

$R_1OM$ or $MOR_4OM$ and the primary and secondary amines of the formulae:

$R_2R_3NH$ or $HNR_3R_5R_3NH$ in which the symbols $R_1$, $R_2$, $R_3$, $R_4$ and $R_5$ are as defined above, and the symbol M represents an alkali metal and particularly sodium and lithium.

Typically, the polydichlorophosphazene is contacted with an excess of the nucleophilic reactants, such excess of the reactive functional groups of the nucleophilic reagent in relation to the chlorine atoms of the polydichlorophosphazene being up to 15 or even 20%.

This substitution reaction is normally carried out in a solvent medium. To illustrate the useful solvents therefor, particularly exemplary are the aromatic hydrocarbons, optionally substituted by one or more atoms or radicals selected from among the alkyl radicals having from 1 to 4 carbon atoms, chlorine atoms or nitro groups, such as benzene, toluene, xylene, 2,4-dichlorotoluene, 1,2-dichlorobenzene, trichlorobenzene, nitrobenzene, tetramethylbenzenes such as 1,2,3,4-tetramethylbenzene; partially hydrogenated aromatic hydrocarbons such as tetralin; cycloaliphatic hydrocarbons such as cyclopentane, cyclohexane, cycloheptane, decalin, methylcyclohexane; ethers such as tetrahydrofuran (THF), dioxane, the dimethyl or diethyl ethers of ethylene glycol, the dimethyl or diethyl ethers of diethylene glycol.

The reaction medium upon completion of the cosubstitution reaction thus comprises, on the one hand, the polyorganophosphazene resulting from the cosubstitution, where appropriate the alcohol or phenol and the salt of metal M resulting from the neutralization of the excess of nucleophilic reactant, as well as the solvent(s) used for the cosubstitution reaction.

In the process according to the invention this reaction medium is transferred into a malaxator which ensures, at the same time, the elimination of the solvents and the washing of the medium resulting from this operation as well as the removal of the products not yet eliminated.

The elimination of the solvents can be carried out by distillation, if necessary under reduced pressure. The mass obtained after this first operation can be washed thereafter in the same malaxator, using an organic liquid which is a nonsolvent for the polymer, but miscible with the residual solvents and the alcohols and phenols. This nonsolvent is advantageously a primary, secondary and tertiary alcohol containing from 1 to 6 carbon atoms, such as methanol and isopropanol.

One or more washings can be carried out using such a nonsolvent, the effectiveness of the washing being monitored by UV spectrographic analysis of the washing solution comprising the nonsolvent for the polymer, the synthesis solvents, the alcohols/phenols from the neutralization and the alkali metal salt.

The washings with an organic nonsolvent can be followed by and/or interspersed with washings with distilled water and/or with a mixture of water/nonsolvent provided that the two products are miscible.

The purification technique for the crude polyorganophosphazenes obtained by cosubstitution of polydichlorophosphazenes as described above combines great simplicity and notable effectiveness. In particular, it employs a device of the malaxator type to which it is easy to attach, if necessary, a heating and vacuum system and means for circulation of additional liquids such as the organic nonsolvent or water, the use of which being described above. The malaxating action allows effective agitation of a more or less viscous medium and intimate contact of this viscous mass with the wash liquids.

In order to further illustrate the present invention and the advantages thereof, the following specific examples are given, it being understood that same are intended only as illustrative and in nowise limitative. In said examples to follow, the reaction/medium introduced into the malaxators had the following composition by weight:

| (i) | Polyphosphazene of formula I, in which: | | |
|---|---|---|---|
| | 52% of Rs represent | p.CH$_3$O—C$_6$H$_4$O— | |
| | 39% of Rs represent | p.(sec. C$_4$H$_9$)—C$_6$H$_4$O— | |
| and | 9% of Rs represent | o.(CH$_2$ = CH—CH$_2$)—C$_6$H$_4$O— | |
| | | | 13.66% |
| (ii) | Trichlorobenzene | | 10.90% |
| (iii) | Diethyleneglycol dimethyl ether | | 66.32% |
| (iv) | Phenols comprising: | | 3.30% |

| | | | |
|---|---|---|---|
| | p-methoxyphenol | 1.6% | |
| | p-sec. butyl phenol | 1.2% | |
| | o-allylphenol | 0.5% | |
| (v) | NaCl | | 5.80% |

EXAMPLE 1

The solution described above was introduced into a malaxator with Z-shaped arms of the ML2 type marketed by Baker and Perkins, having a vent for vapors, space for the foam to expand, a filter to retain particles of polymer, a condenser and a receiver for condensed solvents. The malaxator was actuated and the chamber was heated to 110° C., the entire mass being maintained under reduced pressure at 1,600 Pa.

2,414 g of the solution were introduced and treated accordingly for 180 min., 1,534 g of diethylene glycol dimethyl ether, 220 g of trichlorobenzene and trace amounts of phenols being thus recovered.

Upon completion of this operation, the residual mixture was in the form of a viscous fluid.

By virtue of a solvent feed system comprising a container, an entry port to the chamber of the malaxator, a feed pump and a return to the container by overflow via the filter mentioned above, 5 l of isopropanol were circulated within the malaxator in operation, at the rate of 100 l/h. The medium was maintained at 65° C. during this operation.

The removal of solvents and residual phenols was monitored by UV spectroscopy. When the optical density of the washing solution did not increase further, which occurred after about 30 min., the isopropanol in the container was renewed.

The medium was washed 5 times in this manner using isopropanol, the effectiveness of said washing being monitored by measuring the optical density until a negligible value was obtained.

Thereafter, distilled water was introduced into the malaxator and this washing was continued until the water no longer precipitated silver chloride upon addition of silver nitrate.

A final wash was carried out using 5 l of isopropanol.

The polymer washed in this manner was rolled out into sheets of about 5 mm thickness and then permitted to dry for 12 hours at 60° C. under reduced pressure at 133 Pa. 342 g of dry product were recovered.

The residual phenols were determined by gas phase chromatography from a solution of this polymer in tetrahydrofuran. The quantity of each of the three phenols was less than the minimum detectable level of 40 ppm. The NaCl content, measured by analysis of sodium, was 220 ppm.

EXAMPLE 2

A malaxator with vertical axes and planetary movements, model FH 1,5S marketed by Draiswerke, was used.

The same solution as in Example 1 was introduced into this malaxator and the evaporation of the solvents was conducted by heating the chamber to 115° C. under reduced pressure at 2,000 Pa. From 4,750 g of solution, 2,970 g of diethylene glycol dimethyl ether, 480 g of trichlorobenzene and trace amounts of phenols were recovered.

The rubbery mass remaining in the malaxator washed using methanol circulated by a system identical to that of Example 1.

After 2 hours of continuous washing at 30° C., the U.V. optical density of the methanol exiting the malaxator was negligible.

The rubbery mass was thereafter washed with water, then with methanol, and thereafter rolled out and dried under the conditions of Example 1.

645 g of a polymer were recovered in which the quantity of residual phenols was less than the limit of detection by gas phase chromatography, i.e., 40 ppm. The content of NaCl in the polymer, measured as in Example 1, was 240 ppm.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the purification of crude polyorganophosphazene elastomers produced by the nucleophilic cosubstitution of polydichlorophosphazenes and contained in a reaction medium which comprises said polyorganophosphazenes, reaction solvent for the cosubstitution reaction, excess nucleophilic reagent or product of neutralization thereof or combination of excess nucleophilic reagent and product of neutralization and any alkali metal salts of neutralization present, said process comprising, in a single treatment zone, both eliminating the reaction solvent and thereafter washing the resulting reaction medium with a liquid which is a nonsolvent for the polyorganophosphazenes, but miscible with the other products present in said reaction medium.

2. The process as defined by claim 1, said elimination of reaction solvent being carried out by distillation under reduced pressure.

3. The process as defined by claim 1, said washing being carried out at a temperature of from ambient temperature to 200° C.

4. The process as defined by claim 1, said single treatment zone comprising a discontinuous malaxator.

5. The process as defined by claim 4, said discontinuous malaxator comprising means permitting the elimination of reaction solvent, and means permitting circulation of the liquid which is a nonsolvent for the polyorganophosphazenes, but miscible with the other products present in the reaction medium.

6. The process as defined by claim 1, wherein the formula (I), at least some of the symbols R are monovalent radicals of the formulae:

  (II)

or

  (III)

in which the symbol $R_1$ is an alkyl radical containing 1 to 12 carbon atoms, or a fluorosubstituted such radical; a cycloalkyl radical containing 5 or 6 carbon atoms; a monocyclic- or polycyclic aryl radical, or a substituted such radical bearing one or more chlorine atom substituents, or alkoxy radicals containing 1 to 3 carbon atoms, or linear or branched chain alkyl radicals containing up to 10 carbon atoms or by allyl radicals; the symbol $R_2$ is an alkyl or alkenyl radical containing up to 6 carbon atoms; a monocyclic or polycyclic aryl radical; an alkylaryl radical containing up to 12 carbon atoms; and the symbol $R_3$ is $R_2$ or a hydrogen atom; with the proviso that two R symbols of the same recurring unit can together form a divalent radical of the formulae:

  (IV)

or

  (V)

in which the symbols $R_4$ or $R_5$ are divalent radicals corresponding to the above monovalent radicals $R_1$ and $R_2$, and the symbol $R_3$ is as defined above.

7. The process as defined by claim 6, wherein the R symbols other than those of formulae (II), (III), (IV) and (V) are monovalent alkyl, cycloalkyl, aryl, alkylaryl, alkoxyaryl or aralkyl containing up to 18 carbon atoms, with the proviso that said alkyl radicals or the alkyl moiety of said other radicals are unsubstituted or are substituted by one or more fluorine atoms.

8. The process as defined by claim 1, said liquid nonsolvent comprising a primary, secondary or tertiary alcohol.

9. The process as defined by claim 1, said polyorganophosphazenes having an intrinsic viscosity measured in THF at 30° C. of from 10 to 250 ml/g.

10. The process as defined by claim 1, said reaction solvent comprising an aromatic hydrocarbon, or alkyl, chloro or nitro derivative thereof; a partially hydrogenated aromatic hydrocarbon; a cycloaliphatic hydrocarbon; or an ether.

11. The process as defined by claim 10, said reaction solvent comprising benzene, toluene, xylene, 2,4-dichlorotoluene, 1,2-dichlorobenzene, trichlorobenzene, nitrobenzene, a tetramethylbenzene, tetralin, cyclopentane, cyclohexane, cycloheptane, decalin, methylcyclohexane, tetrahydrofuran, dioxane, the dimethyl or diethyl ether of ethylene glycol, or the dimethyl or diethyl ether of diethylene glycol.

12. The process as defined by claim 1, comprising a plurality of washing stages.

13. The process as defined by claim 12, at least one washing stage being with water.

14. The process as defined by claim 12, at least one washing stage being with a miscible mixture of water/nonsolvent.

15. The process as defined by claim 1, conducted under conditions of agitation.

16. The process as defined in claim 1, said polyorganophosphazenes comprising a plurality of recurring units of the formula:

  (I)

in which the symbols R, which have at least two different definitions within a single recurring unit or have at least two different definitions from one unit to another or have at least two different definitions within a single recurring unit and from one unit to another, are each an alkoxy, fluoroalkoxy, phenoxy, alkylamino or arylamino radical.

* * * * *